US009819852B2

(12) United States Patent
Prentice et al.

(10) Patent No.: US 9,819,852 B2
(45) Date of Patent: Nov. 14, 2017

(54) CAMERA USING PREVIEW IMAGE TO SELECT EXPOSURE

(71) Applicant: Monument Peak Ventures, LLC, Plano, TX (US)

(72) Inventors: Wayne E. Prentice, Honeoye Falls, NY (US); Robert J. Parada, Rochester, NY (US); Tetsuji Uezono, Kanagawa (JP); Kenichi Nakajima, Kanagawa (JP); William V. Fintel, Rochester, NY (US)

(73) Assignee: MONUMENT PEAK VENTURES, LLC, Plano, TX (US)

( * ) Notice: Subject to any disclaimer, the term of this patent is extended or adjusted under 35 U.S.C. 154(b) by 551 days.

(21) Appl. No.: 13/798,692

(22) Filed: Mar. 13, 2013

(65) Prior Publication Data

US 2013/0215314 A1    Aug. 22, 2013

Related U.S. Application Data

(63) Continuation of application No. 12/265,793, filed on Nov. 6, 2008, now Pat. No. 8,488,015.

(60) Provisional application No. 61/014,852, filed on Dec. 19, 2007.

(51) Int. Cl.
*H04N 5/232* (2006.01)
*H04N 5/235* (2006.01)
*H04N 5/243* (2006.01)

(52) U.S. Cl.
CPC ....... *H04N 5/23212* (2013.01); *H04N 5/2352* (2013.01); *H04N 5/23245* (2013.01); *H04N 5/243* (2013.01)

(58) Field of Classification Search
CPC ........... H04N 5/23212; H04N 5/23245; H04N 5/2352; H04N 5/243
USPC ................................ 348/221.1, 222.1, 229.1
See application file for complete search history.

(56) References Cited

U.S. PATENT DOCUMENTS

| 3,971,065 | A | 7/1976 | Bayer |
|---|---|---|---|
| 6,243,133 | B1 | 6/2001 | Spaulding et al. |
| 6,292,218 | B1 | 9/2001 | Parulski et al. |
| 6,301,440 | B1 | 10/2001 | Bolle et al. |
| 6,317,521 | B1 | 11/2001 | Gallagher et al. |

(Continued)

FOREIGN PATENT DOCUMENTS

| JP | 2000-287121 | 10/2000 |
|---|---|---|
| JP | 2007-027967 | 2/2007 |

(Continued)

OTHER PUBLICATIONS

Communication from the EPO on European Patent Application 08867297.7, dated Nov. 22, 2010.

(Continued)

*Primary Examiner* — Antoinette Spinks
(74) *Attorney, Agent, or Firm* — Ascenda Law Group, PC

(57) ABSTRACT

A digital camera comprises an image sensor for providing initial sensor image data and final sensor image data; a lens for exposing the image of a scene onto the image sensor; an exposure control system for adjusting an exposure level of a final image on the image sensor in response to a scene type; and a processor for processing the initial sensor image data to select one of a plurality of scene types, and to process the final sensor image data in response to the scene type.

18 Claims, 9 Drawing Sheets

(56) References Cited

U.S. PATENT DOCUMENTS

| | | |
|---|---|---|
| 6,573,932 B1 | 6/2003 | Adams et al. |
| 6,912,321 B2 | 6/2005 | Gindele |
| 6,937,775 B2 | 8/2005 | Gindele et al. |
| 7,043,090 B2 | 5/2006 | Gindele et al. |
| 7,058,234 B2 | 6/2006 | Gindele et al. |
| 7,071,987 B1 | 7/2006 | Tanaka |
| 7,113,649 B2 | 9/2006 | Gindele |
| 7,130,485 B2 | 10/2006 | Gindele et al. |
| 7,184,078 B2 | 2/2007 | Okisu et al. |
| 7,190,829 B2 | 3/2007 | Zhang et al. |
| 2003/0095197 A1 | 5/2003 | Wheeler et al. |
| 2004/0057632 A1 | 3/2004 | Gindele |
| 2004/0096103 A1 | 5/2004 | Gallagher et al. |
| 2004/0208393 A1 | 10/2004 | Nakakuki |
| 2005/0174591 A1 | 8/2005 | Sowinski et al. |
| 2005/0191729 A1 | 9/2005 | Kaczmarek et al. |
| 2006/0239581 A1 | 10/2006 | Neuman |
| 2007/0013782 A1 | 1/2007 | Kobayashi |
| 2007/0070214 A1 | 3/2007 | Nakamura |
| 2007/0096024 A1 | 5/2007 | Furuya et al. |
| 2007/0206941 A1 | 9/2007 | Maruyama et al. |
| 2007/0292038 A1 | 12/2007 | Takemoto |
| 2009/0195686 A1 | 8/2009 | Shintani |

FOREIGN PATENT DOCUMENTS

| | | |
|---|---|---|
| JP | 2007-288245 | 11/2007 |
| JP | 2007288245 A * | 11/2007 |
| WO | WO-2006/018658 | 2/2006 |

OTHER PUBLICATIONS

Final Rejection on U.S. Appl. No. 12/256,5793, dated May 2, 2011.
Final Rejection on U.S. Appl. No. 12/265,793, dated Mar. 13, 2012.
International Preliminary Report on Patentability for PCT/US2008/013612, dated Jun. 22, 2010.
International Search Report on PCT/US2008/013612, dated Mar. 23, 2009.
Non-Final Office Action on U.S. Appl. No. 12/265,793, dated Oct. 7, 2011.
Non-Final Office Action on U.S. Appl. No. 12/265,793, dated Dec. 27, 2010.
Non-Final Office Action on U.S. Appl. No. 12/265,793, dated Aug. 30, 2012.
Notice of Allowance on U.S. Appl. No. 12/265,793, dated Dec. 26, 2012.
Nozato et al., "Comparison of Retinex Models for Hardware Implementation," IEICE Technical Report, SIS, Jun. 2005, pp. 19-24.

* cited by examiner

| SCENE TYPE | EXPOSURE AND PROCESSING SETTINGS |
|---|---|
| GENERAL | NORMAL SETTINGS |
| HIGH CONTRAST SCENE | EXPOSE FOR HIGHLIGHT TONES, PERFORM NOISE SUPPRESSION IN DARK/SHADOW REGIONS |
| LOW CONTRAST SCENE | STRONGER FLARE CONTROL/COMPENSATION |
| (BLUE) SKY SCENE | LESS AGGRESSIVE CHANGES (DECREASES) IN COLORFULNESS |
| NIGHT SCENE | MORE AGGRESSIVE PRESERVATION OF "BLACK" REGIONS |
| COLOR SATURATED SCENE | MAINTAIN CONTRAST TO PRESERVE SATURATED COLORS |
| TEXT | USES A HIGHER THAN NORMAL SENSOR EXPOSURE LEVEL |

FIG. 5

| SCENE TYPE | RELATIVE EXPOSURE LEVEL (FACE DETECTED IN SCENE) | RELATIVE EXPOSURE LEVEL (FACE NOT DETECTED IN SCENE) |
|---|---|---|
| GENERAL | -1/3 EV | -2/3 EV |
| HIGH CONTRAST SCENE | -1 EV | -4/3 EV |
| LOW CONTRAST SCENE | +1/3 EV | +2/3 EV |
| (BLUE) SKY SCENE | -2/3 EV | -1 EV |
| NIGHT SCENE | +2/3 EV | +1 EV |
| COLOR SATURATED SCENE | -2/3 EV | -1 EV |
| TEXT SCENE | — | +1 EV |

FIG. 6

| CONDITION | FACE INCLUDED | FACE NOT INCLUDED |
|---|---|---|
| 0EV CONDITION | — | — |
| $-\Delta_1 EV$ CONDITION | — | — |
| $-\Delta_2 EV$ CONDITION | $X_3$ EV OR GREATER IN 60% OR MORE AND FACE AREA WITH $Y_1$ EV OR GREATER | $X_3$ EV OR GREATER IN 50% OR MORE |
| $-\Delta_3 EV$ CONDITION | $X_4$ EV OR GREATER IN 25% OR MORE AND $X_5$ EV OR GREATER NOT PRESENT AND $X_2$ EV OR SMALLER IN 10% OR LESS AND FACE AREA $Y_2$ EV OR GREATER AND $Y_3$ EV OR SMALLER | $X_4$ EV OR GREATER IN 25% OR MORE AND $X_5$ EV OR GREATER NOT PRESENT AND $X_2$ EV OR SMALLER IN 10% OR LESS |
| $-\Delta_4 EV$ CONDITION | — | $X_4$ EV OR GREATER IN 20% OR MORE AND $X_5$ EV OR GREATER PRESENT AND $X_1$ EV OR SMALLER IN 10% OR LESS OR $X_0$ EV OR SMALLER IN 20% OR MORE |

FIG. 9

CAMERA USING PREVIEW IMAGE TO SELECT EXPOSURE

CROSS-REFERENCE TO RELATED PATENT APPLICATIONS

This application is a Continuation of U.S. application Ser. No. 12/265,793, filed Nov. 6, 2008, which claims the benefit of U.S. Provisional application 61/014,852, filed Dec. 19, 2007. which are incorporated by reference in their entirety.

FIELD

The present disclosure relates to digital cameras that capture digital images and, more particularly, to digital cameras that identify the type of scene to be captured to adjust exposure.

BACKGROUND

Digital cameras are used by a growing number of consumer and professional photographers. These cameras use one or more CCD or CMOS image sensors to capture images, and digitally process these captured images to produce digital image files, which are stored in a digital memory in the camera.

Prior art Kodak digital cameras use "smart scene" modes to automatically identify a type of scene (e.g. sports, portrait) and to then automatically select an appropriate exposure program for the identified scene type. The exposure program normally sets the f/number, exposure time, and ISO speed used when the image is taken.

It is known that the image processing used in a digital camera can adaptively adjust the signal values according to the dynamic range of the input image. For example, WO2006018658 "Image Processing Method and Computer Software for Image Processing" assigned to Apical, Ltd., teaches image correction processing which comprises altering area image intensity values of an image according to a dynamic range compression image transform. While the patent teaches that this image processing can be used in a digital camera, there is no suggestion that the exposure level of the image sensor in the camera be set based on the type of scene being captured.

It is known that a digital camera can provide image processing to improve images that appear to be underexposed due to difficult lighting situations or insufficient flash. For example, recent Nikon CoolPix cameras include a "D-Lighting" function to fix problems that occur with excessive backlighting and underexposed images. D-Lighting, selected by the user during playback mode, automatically modifies the image to compensate for insufficient flash or excessive back lighting. The camera saves the original image and the corrected copy to the camera's internal or removable memory.

It is known that a digital camera can capture images using a reduced exposure level (e.g. a high ISO setting) in order to preserve more of the image highlights. For example, some Canon DSLR cameras include a "highlight tone priority" (HTP) setting, which allows the camera to utilize the much greater headroom available in the sensor pixels when shooting at elevated ISO settings to recover highlight detail that would otherwise be lost.

It is known that digital images, including digital images captured by a digital camera, can be digitally processed to adjust neutral density balance and color balance. In particular, adaptive neutral density balance adjustment processing can be performed, as described in commonly assigned U.S. Pat. No. 6,243,133 titled "Method for Automatic Scene Balance of Digital Images" to Spaulding, Gindele and Niederbaumer, the disclosure of which is incorporated herein by reference. Automatic color balance can be performed, as described in commonly assigned U.S. Pat. No. 6,573,932 titled "Method for Automatic White Balance of Digital Images" to Adams, Hamilton, Gindele and Pillman, the disclosure of which is incorporated herein by reference. These examples are not limiting, and many other neutral density and color balance adjustment processing solutions may be used.

It is known that digital images, including digital images captured by a digital camera, can be digitally processed to compensate for the presence of flare light. In particular, flare compensation processing can be performed, as described in commonly assigned U.S. Pat. No. 6,912,321 titled "Method of Compensating a Digital Image for the Effects of Flare Light" to Gindele, the disclosure of which is incorporated herein by reference. This example is not limiting, and many other flare compensation processing solutions may be used.

It is known that digital images, including digital images captured by a digital camera, can be digitally processed to compensate for the dynamic range of the scene. In particular, adaptive tone scale adjustment processing can be performed, as described in commonly assigned U.S. Pat. No. 6,937,775 titled "Method of Enhancing the Tone Scale of a Digital Image to Extend the Linear Response Range Without Amplifying Noise" to Gindele and Gallagher, U.S. Pat. No. 7,113,649 titled "Enhancing the Tonal Characteristics of Digital Images" to Gindele, U.S. Pat. No. 7,130,485 titled "Enhancing the Tonal and Color Characteristics of Digital Images Using Expansive and Compressive Tone Scale Functions" to Gindele and Gallagher, U.S. Pat. No. 7,058,234 titled "Enhancing the Tonal, Spatial, and Color Characteristics of Digital Images Using Expansive and Compressive Tone Scale Functions" to Gindele and Gallagher, and U.S. Pat. No. 7,043,090 titled "Enhancing the Tonal Characteristics of Digital Images Using Expansive and Compressive Tone Scale Functions" to Gindele and Gallagher, and commonly assigned U.S. Patent Publication No. US20040096103, filed on Nov. 14, 2002 titled "Method of Spatially Filtering a Digital Image Using Chrominance Information" to Gallagher and Gindele, and U.S. Patent Publication No. US20040057632, filed on Sep. 19, 2002 titled "Enhancing the Tonal Characteristics of Digital Images Using Inflection Points in a Tone Scale Function" to Gindele the disclosures of which are incorporated by reference herein.

It is known that gray level correction can be used to correct the brightness and contrast of an image which is captured under an illumination condition where the subject is photographed alongside a bright light source. Gamma correction and histogram correction are typical examples of the gray level correction that can be used to correct such images. With gamma correction and histogram correction, however, because the image correction is performed using a fixed coefficient, problems may arise where the image is clipped white due to overexposure or in the case of under exposure, clipped black or obscured by noise It is known that adaptive gray level correction (adaptive enhancement) can be used to correct images, where the gray level values of pixels adjacent to a pixel to be corrected are used to determine correction coefficients. With this approach, correction which adapts to the content of an image can be achieved. An example of adaptive gray level correction is disclosed in "Comparison of Retinex Models for Hardware Implementation" by Nosato et al., IEICE technical report, SIS, 2005-16, pp. 19-24 (June, 2005). This adaptive gray level correction is based on Retinex theory, which assumes that an input image is represented by a product of illumination light and reflectivity. Illumination light is separated from an input image to thereby obtain a reflectivity image as a correction image. Given that an input image I is equal to an illumination light L times a reflectivity R (correction image), the relationship of $R(x, y)=\exp\{\log(I(x,y))-\log(L(x,y))\}$ can be achieved. Calculus of variation is used to estimate the illumination light, and a plurality of layers k with a resolution which is $1/2^k$ that of the original image are generated. Calculations for updating the illumination light are repeated, starting from a layer with a lower resolution. Here, the calculation for updating the illumination light is performed using the expression $L(x, y)=L(x, y)-\mu NSD \times G(x, y)$, wherein $G(x, y)$ is a gradient of cost function and $\mu NSD$ is a learning coefficient. Specifically, a processing, in which $G(x, y)$ is first calculated, and $\mu NSD(x, y)$ is then calculated, and based on these calculation results, $L(x, y)$ is calculated, is repeated.

Further, JP2007-27967A discloses that, when a portrait photographing mode is selected by the photographer, an image is captured with the exposure value being set to a value less than the exposure value normally computed by an AE (Automatic Exposure) detector, and gray level correction is applied to the image data from the image sensor by using a gamma transform table for increasing the dynamic range of image data which has been subjected to gray level conversion processing, thereby correcting the brightness value of portions of the image with insufficient brightness which are located in the vicinity of the center of the subject. Note that the portrait photographing mode must be manually selected by the photographer, rather than being automatically determined by the camera by analyzing preview image data.

SUMMARY

It is an object of the present disclosure to provide a digital camera that uses preview image data to adjust the sensor exposure based on scene type, to improve the image quality of a final image.

This object is achieved by providing a digital camera, comprising: an image sensor for providing initial sensor image data and final sensor image data; a lens for exposing the image of a scene onto the image sensor; an exposure control system for adjusting an exposure level of a final image on the image sensor in response to a scene type; and a processor for processing the initial sensor image data to select one of a plurality of scene types, providing the selected scene type to the exposure control system prior to capturing the final sensor image data to cause the exposure control system to adjust the exposure level of the final image on the image sensor, wherein the exposure control system sets the exposure level of the final image differently for different scene types, and processing the final sensor image data in response to the scene type to compensate for the exposure level of the final image on the image sensor.

Advantages

It is an advantage of the present disclosure to provide a digital camera that can produce high quality images for a range of different scene types.

It is an additional advantage of the present disclosure to provide a digital camera that can automatically determine a scene type and adjust an exposure level of a final image on an image sensor in response to the scene type.

It is a further advantage of the present disclosure to provide a digital camera that can automatically determine and apply digital processing to final image data from the image sensor, in response to the scene type, in order to compensate for the exposure level of the final image on the image sensor.

BRIEF DESCRIPTION OF THE DRAWINGS

FIG. 5 is a table showing a representative list of scene types into which it is advantageous to automatically classify captured scenes using the present invention;

FIG. 6 is a table showing the relative exposure level settings for different scene types, both for scenes determined to contain faces and for scenes determined to not contain any faces;

FIG. 9 is a table chart showing a relationship between a brightness histogram and an exposure correction amount according to the embodiment of the present disclosure.

DETAILED DESCRIPTION

The present disclosure provides a digital camera that includes an algorithm that processes initial sensor image data and selects the type of scene to be captured, prior to exposing the image sensor for the final capture. The initial sensor image data is also used to provide a preview image, in order to compose the final image to be captured. The exposure of the scene onto the sensor is automatically set based on the type of scene determined by the algorithm. Different sensor exposure offsets are used for these different scene types. As a result, the sensor output signal level changes based on the scene type. Digital adaptive tone scale processing then compensates for this exposure offset. This enables the digital camera to capture higher quality images for a range of different scene types.

The present invention couples the behavior of the exposure program and the still image processing pipeline, to optimally render the entire dynamic range of each scene type. For example: scenes with average lighting conditions are slightly underexposed to avoid the loss (clipping) of highlight information; bright scenes—including backlit scenes—use lower-than-normal sensor exposure levels in order to preserve the highlight information; and text/document scenes use a higher than normal sensor exposure levels in order to account for the higher-than-average reflectance found in documents. Digital image processing algorithms then adjust the tone reproduction in order to provide a more pleasing processed final image than would have been possible without this coupled behavior.

Example scene types, listed in FIG. 5, include:

General—Used for "average" scenes, also serves as the default type.

High Contrast Scene—Underexposes a scene to capture highlight detail and uses adaptive tone scaling to optimally render the large dynamic range of the scene.

Low Contrast Scene—Expands the contrast to optimally render the relatively low dynamic range of the scene.

(Blue) Sky Scene—Sensitivity to blue sky results in preservation of saturated colors, including sky tint.

Night Scene—Aggressively preserves fidelity of 'black' regions, including nighttime content.

Color Saturated Scene—Maintains contrast to preserve saturated colors.

Text Scene—Uses a higher than normal sensor exposure level in order to account for the higher-than-average reflectance found in documents.

These examples are not limiting, and other scene types that have particular exposure and tone scale characteristics such as scenes with subjects located beyond the distance for flash use, may be found useful to detect and process using the present invention.

Figure 1:
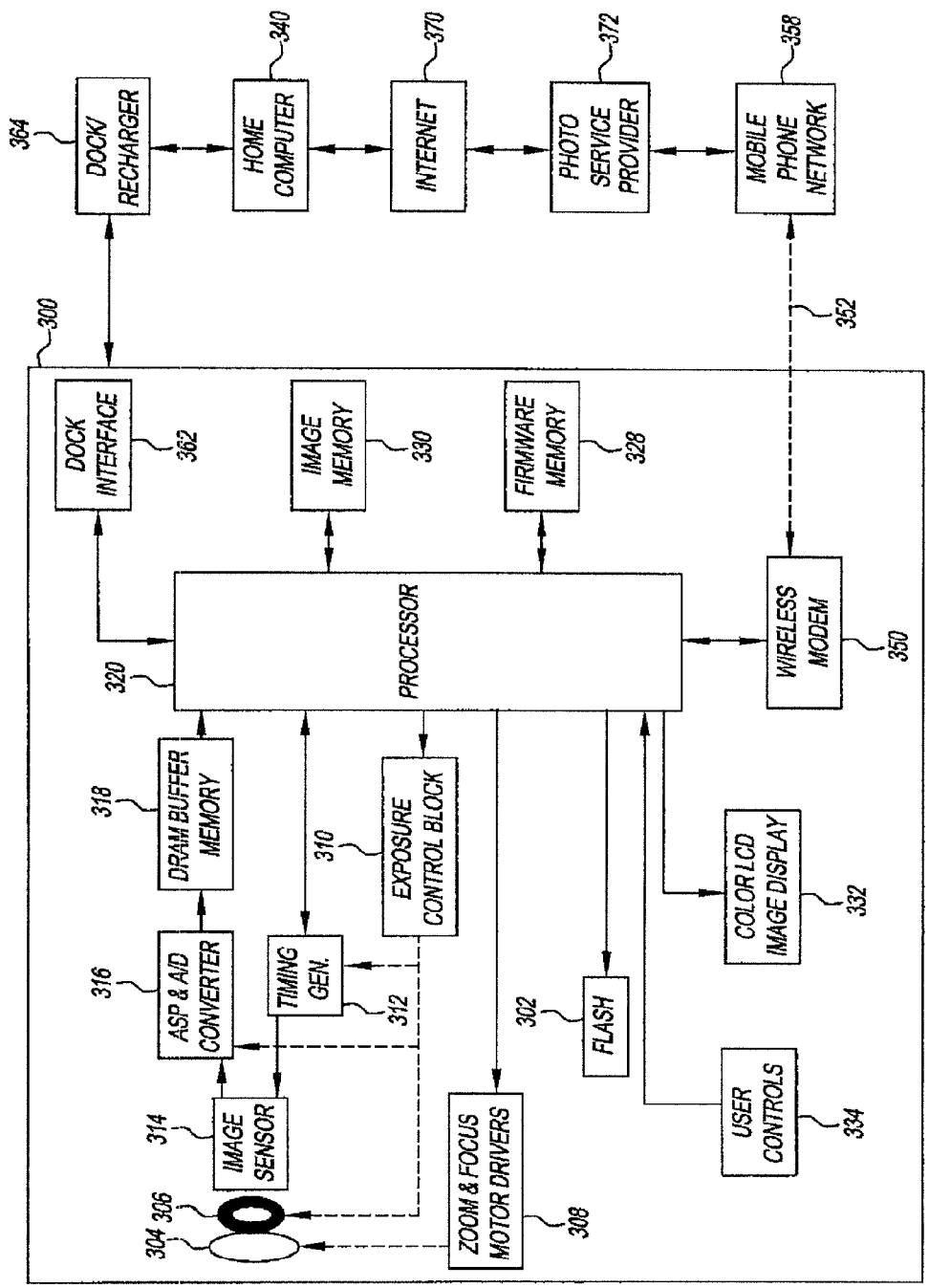
FIG. 1 depicts a block diagram of a digital photography system, including a digital camera 300.

FIG. 1 depicts a block diagram of a digital photography system, including a digital camera 300. Preferably, the digital camera 300 is a portable battery operated device, small enough to be easily handheld by a user when capturing and reviewing images. The digital camera 300 produces digital images that are stored using image memory 330. The digital camera 300 includes a zoom lens 304 having an adjustable aperture and adjustable shutter 306. The zoom lens 304 is controlled by zoom and focus motor drives 308. The zoom lens 304 focuses light from a scene (not shown) on an image sensor 314, for example, a single-chip color CCD or CMOS image sensor. The output of the image sensor in converted to digital form by Analog Signal Processor (ASP) and A/D converter 316, and temporarily stored in DRAM buffer memory 318. The data stored in the DRAM buffer memory 318 is subsequently processed by a processor 320 using firmware programs stored in firmware memory 328. Alternatively, the processor 320 can be provided by custom circuitry (e.g. by one or more custom integrated circuits (ICs) designed specifically for use in digital cameras), or by a combination of programmable processor(s) and custom circuits. The processed images are then stored using image memory 330. It is understood that the image memory 330 can be a removable Flash memory card, internal Flash memory chips, magnetic memory, or optical memory. In alternative embodiments, the digital camera 300 can also capture motion video images. In alternative embodiments, the digital camera 300 can include other functions, including the functions of a digital music player (e.g. MP3 player), a mobile telephone, or a programmable digital assistant (PDA).

The image sensor 314 is controlled by a timing generator 312. The image sensor 314 can have, for example, 10.2 megapixels (3680 pixels by 2760 pixels). To provide a color image, the image sensor is overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color Imaging Array" to Bayer, the disclosure of which is incorporated herein by reference. As a second example, the different color pixels can be arranged as described in commonly assigned U.S. Publication No. US2005191729, filed on Jul. 28, 2007 and titled "Image Sensor with Improved Light Sensitivity" to Compton and Hamilton, the disclosure of which is incorporated herein by reference. These examples are not limiting, and many other color patterns may be used.

The image sensor 314 is effective when actuated in a first mode by timing generator 312 for providing initial sensor image data, which is also used for previewing the final image that will be captured in a second mode. This preview mode sensor image data is provided as a low resolution output, which can have, for example, 460 pixels by 345 pixels, which is a factor of 8 fewer rows and columns of pixels than is normally used for reading out the final image from the 10.2 megapixel sensor. The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 "Electronic camera for initiating capture of still images while previewing motion images" which is incorporated herein by reference. In an alternative embodiment, the digital camera 300 uses an optical viewfinder, and the initial sensor image data is used only to determine the exposure level of the final image, not to provide a preview images.

The image sensor 314 is also effective when actuated in a second mode by timing generator 312 for providing final sensor image data. This final mode sensor image data is provided as high resolution output image data, which for scenes having a high illumination level includes all of the pixels of the image sensor, and can be, for example, 10.2 megapixel final image data having 3680 pixels by 2760 pixels. At lower illumination levels, the final sensor image data can be provided by "binning" some number of like-colored pixels on the image sensor, in order to increase the signal level and thus the "ISO speed" of the sensor.

The zoom and focus motors 308 and the timing generator 312 are controlled by control signals supplied by processor 320. An exposure control block 310 controls the exposure level of the image sensor 314, by controlling the f/number and exposure time of the adjustable aperture and adjustable shutter 306, and the gain (i.e. ISO speed) setting of the ASP & A/D converter 316. The exposure control block 310 also controls a flash 302 which can illuminate the scene. While shown as a separate block 310, it is understood that some, or all, of the functions of the exposure control block 310 can alternatively be performed by the processor 320.

The processor 320 also creates a lower-resolution image that can be reviewed on the color LCD image display 332. The graphical user interface displayed on the color LCD image display 332 is controlled by user controls 334. The user controls 334 are used to select various camera modes, such as the "preview image analysis" mode which will be described later in reference to FIG. 3, as well as more traditional modes such as sports mode, night mode, landscape mode, and close-up mode. The user controls 334 are also used to turn on the camera, control the zoom lens, and initiate the picture taking process.

When the user sets the digital camera 300 in the "preview image analysis" mode and begins to take a picture, the processor 320 automatically processes the preview sensor image data to select one of a plurality of scene types, to be described later in reference to FIG. 5. The processor 320 then communicates the selected scene type to the exposure control block 310 prior to initiating image capture of the final sensor image data. The exposure control block 310 then adjusts the exposure level of the final image on the image sensor, by setting appropriate f/number, exposure time, and ASP gain values, such that the exposure level of the final image is set differently for the different scene types. After the final sensor image data has been provided by the image sensor 314, the processor 320 processes this final sensor image data, in response to the scene type, to compensate for the exposure level of the final image on the image sensor.

The processor 320 also provides additional calculations, such as focus calculations used to focus the lens 304, during the preview mode. The processor 320 also provides additional processing of the final sensor image data, using the "standard image pipeline" depicted in FIG. 2, in order to produce rendered sRGB image data which is stored within a "finished" image file, such as a well-known Exif-JPEG image file, in the image memory 330.

The digital camera 300 can be connected via a dock interface 362 to a dock/recharger 364, which is connected to a home computer 340. The dock interface 362 can conform to, for example, the well-known USB 2.0 interface specification. Alternatively, the interface between the digital camera 300 and the home computer 340 can be a wireless interface, such as the well-known Bluetooth wireless interface or the well-known 802.11 wireless interface. The home computer 340 can upload images via the Internet 370 to a photo service provider 372, such as the Kodak EasyShare Gallery.

The processor 320 is coupled to a wireless modem 350, which enables the digital camera 300 (which can also include mobile phone functions, as described earlier) to transmit and receive information via an RF channel 352. The wireless modem 350 communicates over a radio frequency (e.g. wireless) link with a mobile phone network 358, such as a 3GSM network. The mobile phone network 358 communicates with a photo service provider 372, which can store digital images uploaded from the digital camera 300. These images can be accessed via the Internet 370 by other devices, including the home computer 340.

Figure 2:
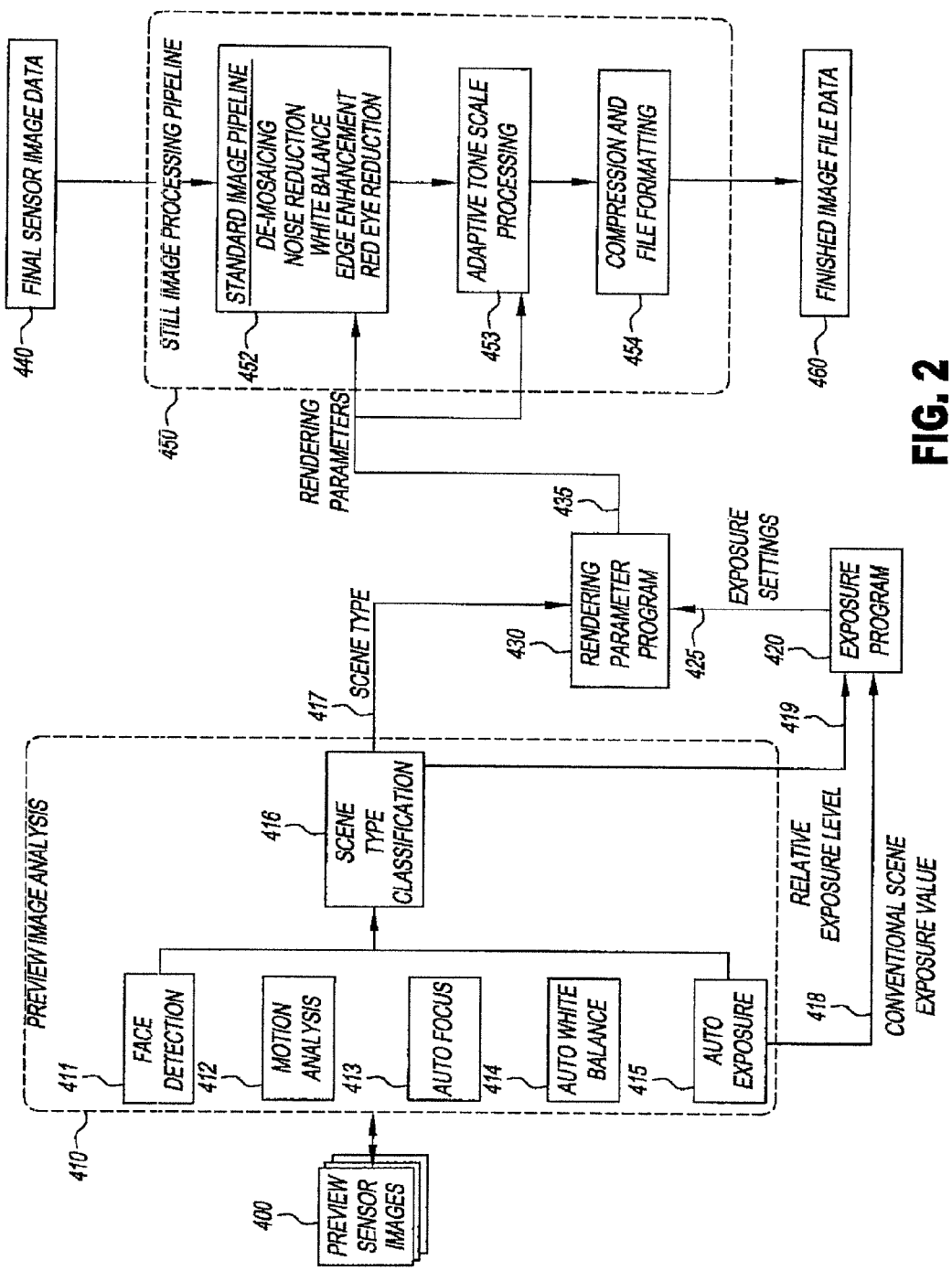
FIG. 2 depicts an image-processing diagram employed by the processor 320 of the digital camera 300.

FIG. 2 depicts an image-processing diagram employed by the processor 320 of the digital camera 300 to effect the present invention. The preview sensor images 400 (which are also used to provide an electronic viewfinder on the color display 332 as the user composes the image to be captured) provide input to the components of a preview image analysis 410 image processing function. In a preferred embodiment, this processing function is comprised of a set of distinct image analysis capabilities consisting of, face detection 411, motion analysis 412, auto focus 413, auto white balance 414, and auto exposure 415. Such distinct image analysis capabilities are now standard in many commercially available digital camera systems, and those skilled in this art will be acquainted with their performance and the analysis results they provide. These analysis results are used to perform scene type classification 416, resulting in the determination of the scene type 417 for a given scene. The scene type classification 416 also provides a relative exposure level 419, which depends on the scene type, as will be described later in reference to FIG. 6.

It is useful to further describe the motivation for the preview image analysis 410, to emphasize the novelty of this design. The exposure control 310 sets the exposure of the scene onto the image sensor 314 in order to best map the information in the scene to the dynamic range of the image sensor 314. The dynamic range is the ratio of the brightest detectable object in a scene divided by the darkest detectable object. Any signals beyond the sensor saturation level, at the bright end of the dynamic range, are clipped by the image sensor 314, meaning that, beyond the clipping point, adding more light does not increase the sensor output signal level.

The dark end of the dynamic range is limited more gracefully. It gradually becomes enveloped by noise. The goal of preview image analysis 410 is to detect the scene type 417 and select exposure settings that balance between clipping of scene highlights and noise masking of dark regions in the image. This method is an innovation over the automatic exposure systems employed in prior art digital cameras, where the exposure settings are selected so the output image has the correct overall brightness, regardless of the dynamic range of the scene. Consideration of what image data is lost to clipping or noise, as a function of the scene dynamic range, is not part of these prior art camera automatic exposure systems. As will be described in further detail with respect to FIG. 3 and FIG. 4, the adaptive tone scale processing 453 must work in concert with the scene exposure value 418 and relative exposure level 419, to produce finished image file data 460 with high image quality.

In addition to the determination of scene type 417, the outputs of the preview image analysis function 410 also control other sub-systems of the digital camera 300 including the zoom & focus motor drivers 308 and the exposure control 310. Changes in these sub-systems result in changes in the view finder images displayed on the color display 332. As shown in FIG. 2, the conventional scene exposure value 418 and the scene-type dependent relative exposure level 419 are used by an exposure program 420 to determine appropriate exposure settings 425, including the exposure time and f/number of the adjustable aperture and adjustable shutter 306, and the gain (i.e., ISO speed) setting of the ASP & A/D converter 316, used during the capture of final sensor image data. The exposure value that corresponds to the exposure setting 425 is equal to the value of the conventional scene exposure value 418 shifted by an amount equal to the relative exposure level 419 for the particular scene type 417 determined by scene type classification function 416.

The scene exposure settings 425 and the scene type 417 are used by a rendering parameter program 430 to determine a set of rendering parameters used by a still image processing pipeline 450 to automatically determine and apply digital processing to the final sensor image data 440, in order to compensate for the exposure level of the final image on the image sensor. The rendering parameters 435 can also provide scene type specific processing parameters for other processing functions, such as noise reduction and edge enhancement.

Those skilled in the art will be well acquainted with the basic processing blocks of the still image processing pipeline 450 in a digital camera 300. The standard image pipeline 452 consists of operations well known in the art, including de-mosaicing (also known as color pixel interpolation), noise reduction, white balance, edge enhancement, and red eye reduction. Adaptive tone scale processing 453 is then applied to final sensor image data 440, in concert with the standard image pipeline 452, as part of the still image processing pipeline 450. The adaptive tone scale processing 453 will be described in detail later, in reference to FIG. 4. Following these operations, the resulting processed image data are compressed using standard compression algorithms (e.g. JPEG compression) and formatted to conform to standard image formats, such as the well-known Exif-JPEG format, in block 454, in order to produce finished image file data 460.

Figure 3:
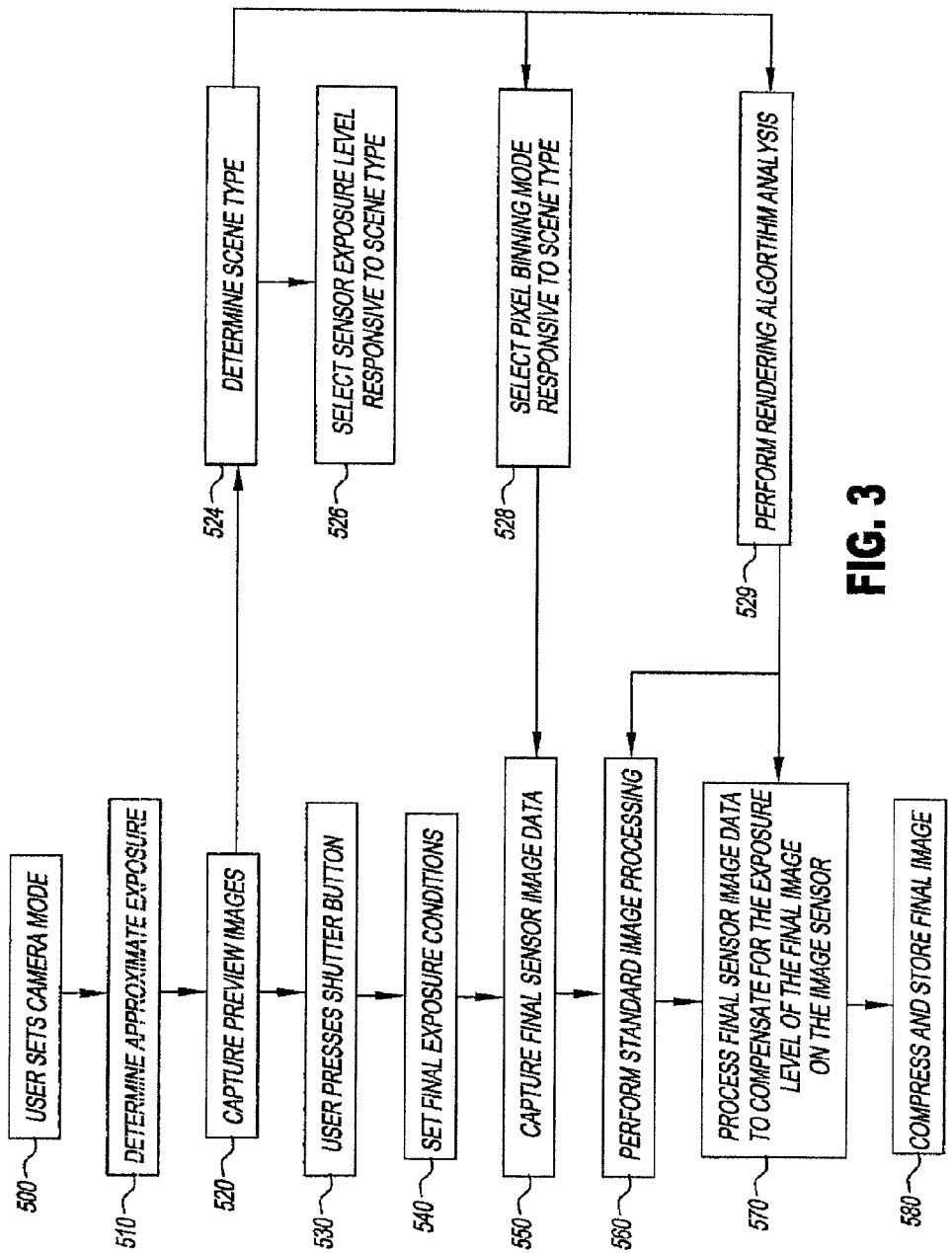
FIG. 3 depicts a flow diagram showing an embodiment of the present invention.

FIG. 3 depicts a flow diagram showing a first embodiment of the present invention. In block 500, a user sets the camera mode, using the user controls 334, to use the preview image analysis function 410 so that the digital camera 300 will later determine the scene type 417 and the associated exposure settings 425 and rendering parameters 435 appropriate for that scene type 417. In block 510, the processor 320 determines an approximate exposure to be used to capture the initial preview sensor image data. In block 520, preview images are captured and used to provide images for an electronic viewfinder on the color display 332. These preview sensor images 400 are used by the preview image analysis processing function 410 to determine the scene type in block 524.

The scene type can be determined as described in common assigned U.S. Publication No. US20070096024, titled "Image Capturing Apparatus" (which claims priority from JP 2007-121654 A), the disclosure of which is incorporated herein by reference.

After the user presses the shutter button (one of the user controls 334) in block 530, in block 526 the scene type 417 is used to set the sensor relative exposure level 419. In other words, the exposure control system sets the exposure level of the final image differently for the different scene types shown in FIG. 6, since the relative exposure level 419 depends on the type of scene detected. In block 540, the exposure settings 425, which are a function of the relative exposure level 419, are used to set the exposure conditions used to capture the final sensor image data 440.

Following the setting of final exposure conditions in block 540, in block 550 the final sensor image data 440 is captured. In preparation for this capture, in block 528, a pixel binning mode is selected for low light scenes. The binning mode selected in block 528 is responsive to the scene type, and is used in block 550 as the final sensor image data 440 is captured. At high light levels, the binning mode is "no binning", and all of the pixels of the image sensor 314 are output as final sensor image data. As the light level is reduced to the "3 bin" threshold, the signals from 3 pixels of the same color are combined as the signal from the image sensor 314 is read out, in order to increase the signal level, while reducing the sensor resolution. As the light level is reduced further, to the "9 bin" threshold, the signals from 9 pixels of the same color are combined as the signal from the image sensor 314 is read out, in order to further increase the signal level, while reducing the sensor resolution. In the present invention, these "3 bin" and "9 bin" thresholds are set differently, for the different scene types (with and without faces detected) listed in FIG. 6

In block 529, rendering algorithm analysis is performed by the rendering parameter program 430 to determine the appropriate rendering parameters 435 to use during digital compensation (e.g., adaptive tone scale processing 453 and noise reduction and edge enhancement processing in standard image pipeline 452).

In block 560, the final sensor image data 440 is processed by the standard image processing pipeline 452. This includes performing standard image pipeline 452 functions (e.g., performing noise reduction, de-mosaicing, white balance, edge enhancement and red eye reduction) described earlier in reference to FIG. 2.

In block 570, the final sensor image data, having been processed by the standard image processing pipeline 452, is processed using adaptive tone scale processing function 453, to adjust the contrast and to correct for the exposure level of the final image on the image sensor, as will be described later in reference to FIG. 4.

In block 580, the processed final image data is compressed and stored as finished image file data 460 in the image memory 330.

Figure 4:
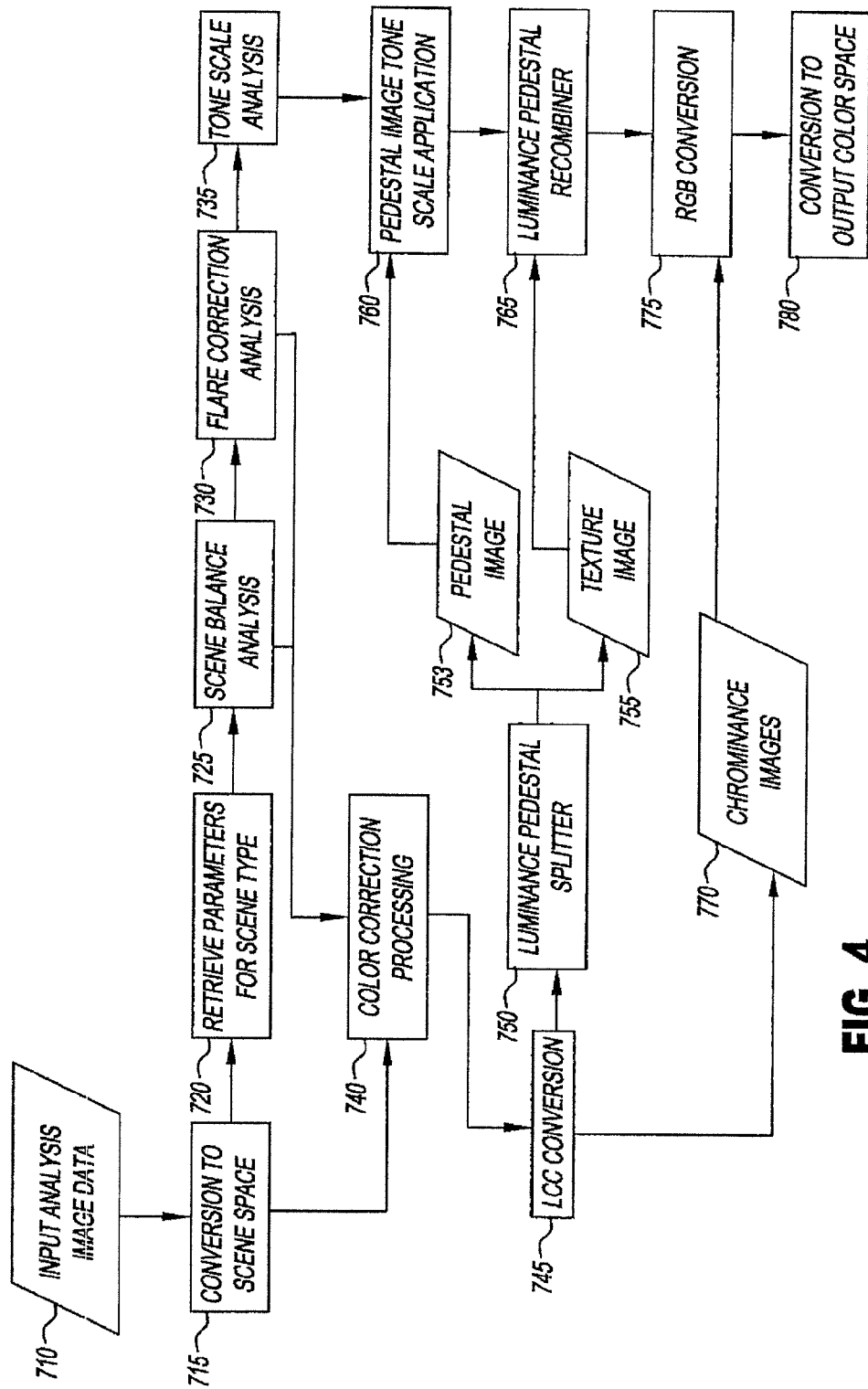
FIG. 4 depicts an example of an image-processing diagram employed for adaptive tone scale processing block 453 in FIG. 2.

FIG. 4 depicts an example of an image-processing diagram for adaptive tone scale processing 453 in FIG. 2. The input analysis image data 710, which is the output of the standard image processing pipeline 452 in FIG. 2, undergoes conversion to scene space encoding (e.g., ERIMM RGB as specified in the ISO/TS 22028-3:2006 standard) in block 715. In block 720, the rendering parameters 435 determined according to the selected scene type 417 are retrieved and provided to component analysis operations that include, scene balance analysis block 725, flare correction analysis block 730, and tone scale analysis block 735. The results of scene balance analysis block 725 and flare correction analysis block 730 are used in block 740 to perform color correction processing (e.g. neutral balance, color balance, and flare correction) of the scene-space converted input analysis image data 710 as described, for example, in commonly-assigned U.S. Pat. No. 6,912,321 titled "Method of Compensating a Digital Image for the Effects of Flare Light" to Gindele, the disclosure of which is incorporated herein by reference. In block 760, the results of tone scale analysis block 735 are used to perform pedestal image tone scale application (e.g., contrast adjustment) as described, for example, in commonly-assigned U.S. Pat. No. 7,113,649, titled "Enhancing the Tonal Characteristics of Digital Images" to Gindele, the disclosure of which is incorporated herein by reference.

A pedestal image is generated by performing luminance-chrominance (LCC) conversion on the color-corrected image data in block 745 and subsequently splitting the luminance portion of the data, in luminance pedestal splitter block 750, into a pedestal image 753 and a texture image 755. The tone scale of the pedestal image 753 us adjusted in pedestal image tone scale application block 760. The enhanced pedestal image is recombined with the luminance texture image 755 in luminance pedestal recombiner block 765 to produce an enhanced luminance image. The enhanced luminance image and chrominance images 770 are collectively color converted to three-color (e.g., RGB) data by the RGB conversion 775 module. In block 780, the image data are converted to the output color space appropriate for the finished image file data 460, such as the sRGB output space.

FIG. 6 is a table showing the relative exposure level 419 for seven specific scene types, both for scenes determined to contain faces and for scenes determined to not contain any faces. The relative exposure level values are given in exposure value (EV) units (i.e. photographic stops).

For high contrast scenes, the sensor is underexposed (relative to a photographic normal exposure) by a one photographic stop (i.e. −1 EV unit) when a face is detected in the scene, and the relative exposure level is "4/3 EV when a face is not detected.

For low contrast scenes, the sensor is overexposed by +1/3 EV unit when a face is detected in the scene, and the relative exposure level is +2/3 EV when a face is not detected.

For scenes that include significant patches of blue sky, the relative exposure level is −2/3 EV when a face is detected in the scene, and −1 EV when a face is not detected in the scene.

For night scenes, the relative exposure level is +2/3 EV when a face is detected in the scene, and +1 EV when a face is not detected in the scene.

For scenes containing significant areas of high color saturation, the relative exposure level is −2/3 EV when a face is detected, and −1 EV when a face is not detected in the scene.

For documents and other type of text scenes, the relative exposure level is +1 EV. If a face is detected in a scene, it is never classified as a text type scene. For all other scenes, the "general" category is used, and the relative exposure level is −1/3 EV when a face is detected, and −2/3 EV when a face is not detected in the scene.

As previously discussed, it is an important aspect of the present invention that the exposure control system be coupled to the adaptive tone scale processing 453. The example shown in FIG. 4 is not limiting and many other types of adaptive tone scale processing may be used. In addition, additional types of adaptive processing operations may be useful to couple to exposure control settings as a function of selected scene type 417 including, for example, color saturation, sharpness adjustment, and noise reduction.

Figure 7:
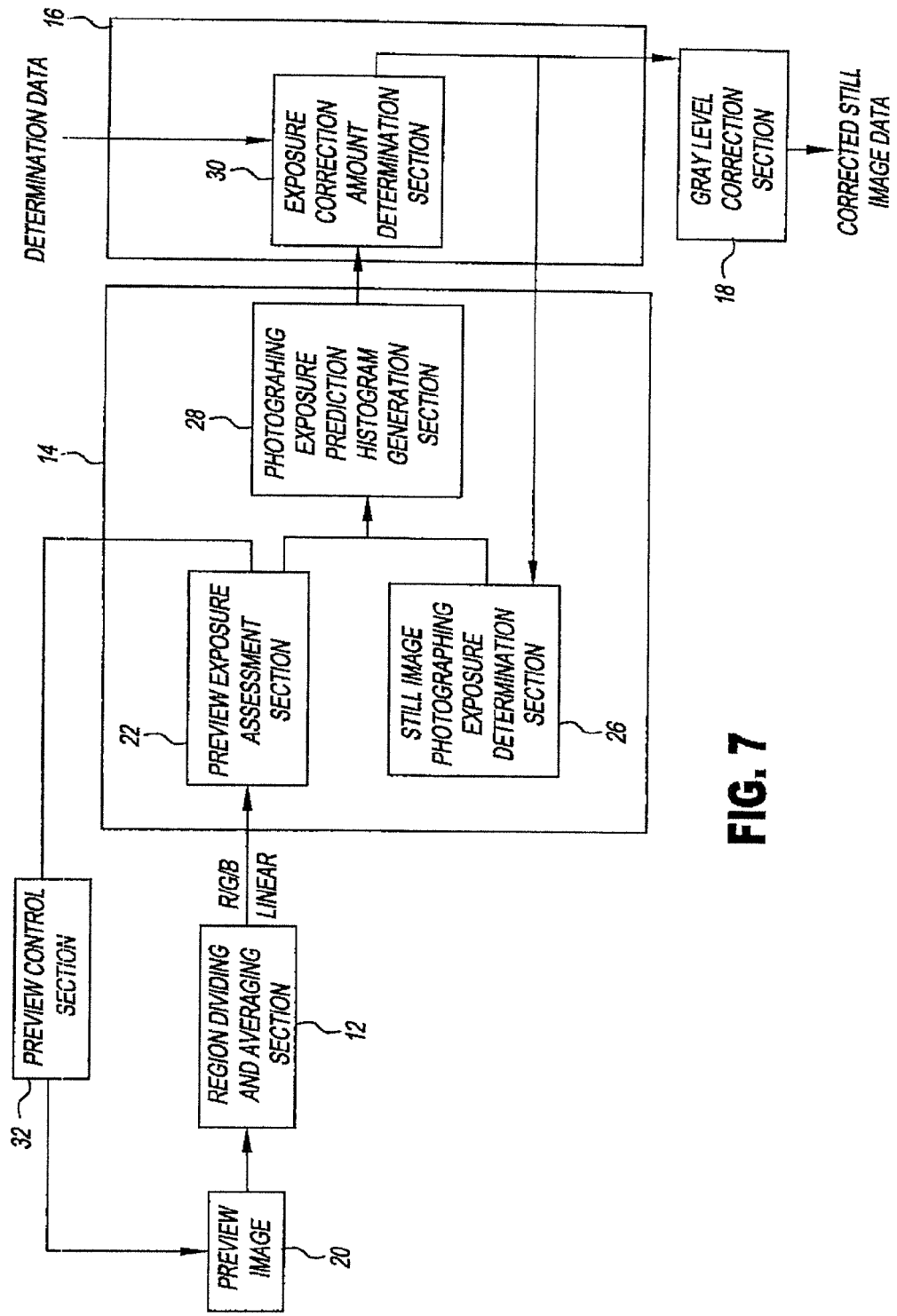
FIG. 7 is a flowchart showing the signal flow in an alternative embodiment of the present invention.

FIG. 7 is a flowchart showing the signal flow used in an alternative embodiment of the present invention. A region dividing and averaging section 12 divides preview image data 20 provided by the image sensor 314 (see FIG. 1) into a plurality of regions or blocks, and calculates and outputs an average pixel value for each region. For example, the region dividing and averaging section 12 can divide the whole image data into n×m rectangular regions (for example 12×8 regions) and calculates a simple average of R, G, and B pixel values for each region.

An Exposure Assessment (EA) section 14 performs exposure assessment for preview mode, based on the preview image data 20 to calculate an appropriate exposure value. The preview exposure assessment can be achieved either by measuring the light intensively in the center portion of the image, or using a multipoint light measurement method. In addition, the EA section 14 generates a brightness histogram using the preview image 20, and provides the brightness histogram to an exposure correction amount calculation section 16.

More specifically, preview exposure assessment section 22 calculates an assessment value for controlling the exposure of the preview image. The assessment value thus calculated is supplied to a preview exposure control section 32 so that the preview image 20 is set to an appropriate exposure value. A photographing exposure prediction histogram generation section 28, using the data supplied from the preview exposure assessment section 22, generates a brightness histogram. This histogram is what would be obtained from the image data of a still image which captured with the current exposure value. More specifically, the photographing exposure prediction histogram generation section 28 converts the average value of the R, G, and B color values for each block (from region dividing and averaging section 12) into brightness Y, and then converts the brightness Y into EV (exposure value) units equal to log 2 (brightness Y/appropriate exposure value). After the EV value for each block is calculated, a histogram is generated. The horizontal axis of the histogram is the deviation amount (in EV units) relative to a so-called "normal" photographic exposure, and the vertical axis is the number of blocks with this deviation amount. The histogram calculated by the exposure prediction histogram generation section 28 is provided to the exposure correction amount calculation section 16.

The exposure correction amount calculation section 16 calculates an exposure correction amount with respect to the appropriate exposure, by determining whether or not the brightness histogram satisfies specific conditions, and supplies the exposure correction amount to the EA section 14 and a gray level correction section 18. The exposure correction amount calculation section 16 calculates the exposure correction amount on the assumption that the image data of a captured image is to be subjected to gray level correction by the gray level correction section 18.

The gray level correction section 18 applies adaptive gray level correction to the image data of a still image captured with exposure correction, based on the exposure correction amount obtained from the exposure correction amount calculation section 16 and the appropriate exposure value (a reference of exposure). The gray level correction section 18 could use, for example, the adaptive tone scale processing described earlier in relation to FIG. 4.

In alternative embodiments, gray level correction methods may be used to applying a tone scale correction transformation to the brightness data by using an adaptive gamma function and by also correcting the color difference data, thereby performing gray level correction. The gray level correction section 18 performs gray level correction so that exposure of the still image data captured with underexposure is compensated for, to thereby achieve the appropriate exposure in the corrected digital still image. The correction amount for the gray level correction is decreased when the exposure correction amount is small and the correction amount for the gray level correction is increased when the exposure correction amount is large. In the latter case, distortion due to the gray level correction may be noticeable in some types of images.

Figure 8:
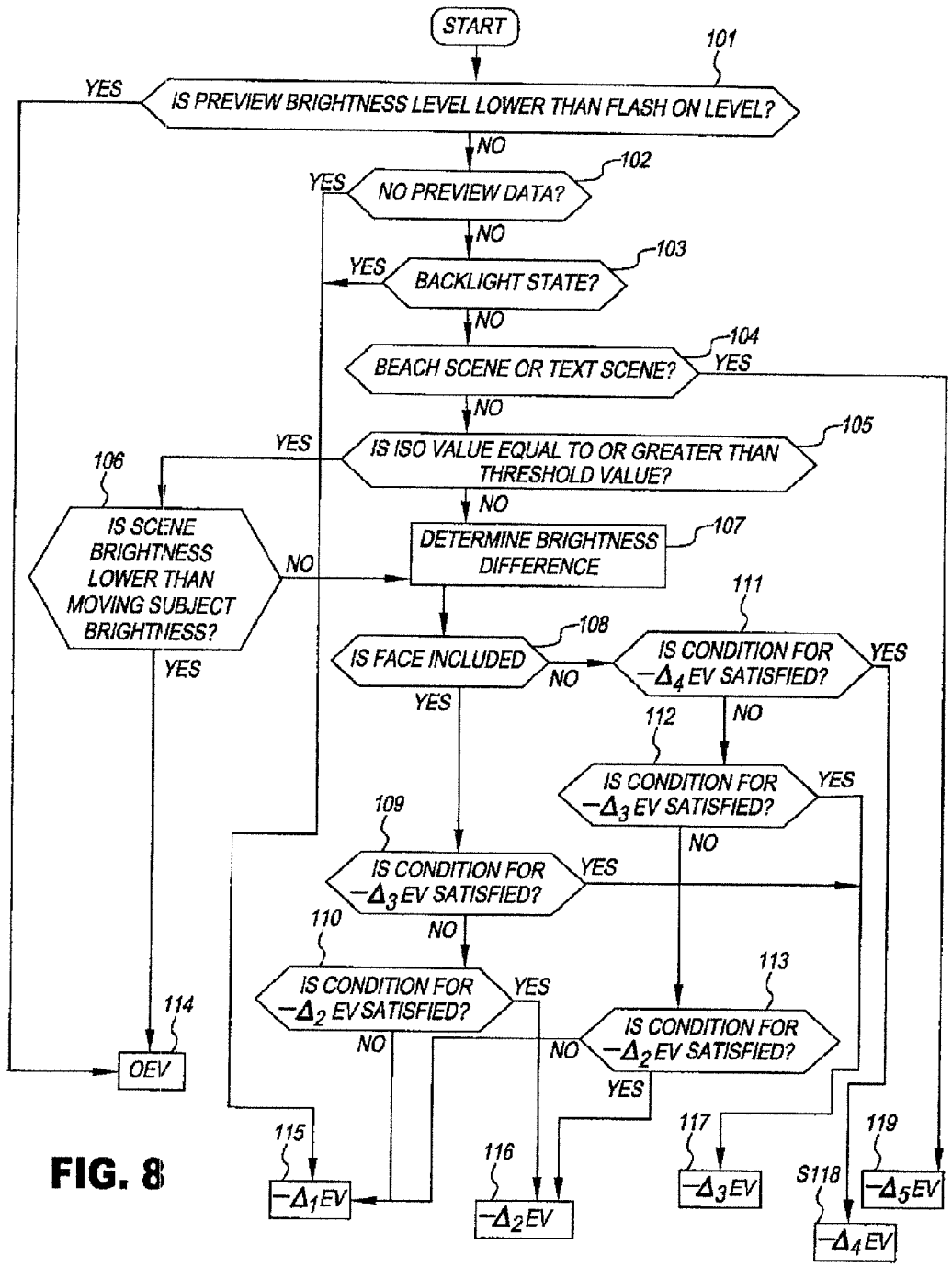
FIG. 8 is a flowchart showing an example of a process for scene type classification.

FIG. 8 is a flowchart showing an example of a process for scene type classification according to some embodiments of the present invention. In this example, the exposure correction amount is set to one of six levels, relative to the appropriate exposure value for a "normal" exposure. More specifically, the exposure correction amount $\Delta EV$ is set to one of 0 EV, $-\Delta_1$ EV, $-\Delta_2$ EV, $-\Delta_3$ EV, $-\Delta_4$ EV, and $+\Delta_5$ EV. Here, the positive sign in front of the exposure correction amount indicates overexposure with respect to a "normal" exposure value, and the negative sign in front of the exposure correction amount indicates underexposure with respect to a "normal" exposure value. Also, the relationship of $\Delta_1 < \Delta_2 < \Delta_3 < \Delta_4$ is satisfied.

First, in block 101 of FIG. 8, the processor 320 of the digital camera 300 (see FIG. 1) determines whether or not the brightness level of the preview image (if present) is lower than a level at which a strobe light (flash) needs to be on. Since the scene to be photographed is dark if the flash needs to be fired, this determination is made in order to prevent an extreme underexposure condition. Accordingly, if the brightness level is lower than the flash ON level, the exposure correction amount $\Delta EV$ with respect to the approximate exposure value is set to 0 EV. Specifically, in this case, the appropriate "normal" exposure value is maintained (block 114).

If the brightness level of the preview image is equal to or higher than the level at which flash should be on, on the other hand, it is then determined whether or not the preview image data is not present (102). The preview image data does not exist immediately after the power to the digital camera 300 is turned on, or immediately after the digital camera 300 is switched from the image review mode to the image capture (e.g. photographing) mode. When a user presses the shutter button completely with a single press when the camera is in review mode, exposure correction cannot be performed due to the absence of the preview image data. Accordingly, when there is no preview image data, higher priority is given to photographing than to exposure correction, and the exposure correction amount calculation section 16 sets the exposure correction amount to a default underexposure value (block 115). Specifically, the exposure correction amount calculation section 16 sets the exposure value to be less than the appropriate "normal" exposure value by an exposure correction amount equal to $\Delta_1$ EV.

If the preview image is present, it is then determined whether or not a backlight condition is present in the scene to be photographed (block 103). If a backlight condition is determined, the flash is fired to provide "fill flash". In this situation, the exposure correction amount calculation section 16 sets the exposure correction amount to the default underexposure value of $\Delta_1$ EV If the scene does not have a blacklight, in block 104 it is determined whether or not the scene is a beach scene or a text (document). This determination is made because these types of scenes are preferably with captured using an exposure level greater than the "normal" exposure values, because of the high reflectance of the sand or paper in such scenes. For these types of scenes, the exposure correction amount calculation section 16 sets the exposure correction amount $\Delta$EV to be $+\Delta_5$ EV (block 119), which is greater than the "normal" exposure value. Specifically, the exposure correction amount calculation section 16 sets the exposure value to be over the appropriate exposure value by the exposure correction amount. The determination as to whether or not the scene is a beach scene or a text (document) photographing scene can be performed by using well-known methods, such as common assigned US patent application US20070096024, "Image Capturing Apparatus", the disclosure of which is incorporated herein by reference, which describes methods for determining the type of scene based on a combination of the temperature, movement, hue, chroma, brightness, and other image characteristics.

In block 105 of FIG. 8, if the photographic scene is not a specific scene type, it is then determined whether or not the ISO exposure index (provided by the image sensor 314 and ASP/A/D 316) is equal to or greater than a threshold value. When the scene to be photographed is dark, the shutter speed is fixed so as to prevent the camera from shaking and the ISO is increased to increase the sensitivity. However, this high ISO setting increases the image noise. Therefore, when the ISO is equal to or greater than a threshold value, the exposure correction amount calculation section 16 sets the exposure correction amount $\Delta$EV to equal 0 EV, so that a "normal" exposure level is maintained.

The ISO exposure index may be high either because: case (1) the scene is dark; or case (2) the scene is not dark, but a high-speed shutter (i.e. short exposure time) is used to freeze the motion of a moving subject, so the gain of the ASP & A/D converter 316 has been increased. In block 106, the scene brightness level is checked to see if it's lower than the moving subject brightness. "Yes" corresponds to case (1), and the exposure correction amount $\Delta$EV to set equal 0 EV (block 114), as described above, to prevent a further increase in noise. "No" corresponds to case (2), where in block 107, a brightness difference is determined by using the histogram described earlier in reference to FIG. 7. Then, in blocks 108-113, various conditions are checked to determine the $\Delta$EV value to be used to capture the final still image.

Specifically, in block 108, it is determined whether or not the scene includes a person's face. Methods for detecting a person's face are well known, and can include, for example, extracting regions of image data which include a skin color, and determining how well these regions match a face template. If it is determined that the scene includes a person's face in block 108, in block 109 the brightness histogram is checked to determine whether or not it satisfies the conditions corresponding to the exposure correction amount $\Delta EV=-\Delta_3$ EV. The condition for setting $\Delta EV=-\Delta_3$ EV can be, for example, whether the histogram includes values (deviation amounts) of x4 EV or greater in 20% or more of the regions, no values of x5 EV or greater in any of the regions, values of x2 EV or less in 10% or less of the regions, and a face area with y2 EV or greater and y3 EV or less.

If this condition for $-\Delta_3$ EV is not satisfied in block 109, then in block 110 it is determined whether or not the brightness histogram satisfies the conditions corresponding to the exposure correction amount $\Delta EV=-\Delta_2$ EV which can be, for example, whether the histogram includes values of x3 EV or greater in 60% or more of the regions, and a face area with y1 EV or greater.

If the brightness histogram satisfies neither the $-\Delta_3$ EV nor the $-\Delta_2$ EV conditions, the exposure correction amount calculation section 16 sets the exposure correction amount $\Delta$EV to a default value of $-\Delta_1$ EV (block 115). If the brightness histogram satisfies the conditions for $-\Delta_2$ EV, the exposure correction amount calculation section 16 sets the exposure correction amount $\Delta$EV to a value of $-\Delta_2$ EV (block 116). This means that the still image will be captured with the exposure value set to a value which is lower than the default underexposure value. If the brightness histogram satisfies the conditions for $-\Delta_3$ EV, the exposure correction amount calculation section 16 sets the exposure correction amount $\Delta$EV to a value of $-\Delta_3$ EV (block 117). This means that the still image will be captured with the exposure value being set to a value which is even lower than the $-\Delta_3$ EV underexposure value.

If the scene does not include a person's face, in block 111 it is determined whether or not the brightness histogram satisfies the conditions corresponding to $-\Delta_4$ EV, and if not whether or not the brightness histogram satisfies the conditions corresponding to $-\Delta_3$ EV in block 112, and if not whether or not the brightness histogram satisfies the conditions corresponding to $-\Delta_2$ EV in block 113. The conditions for setting the above exposure correction amounts can be, for example:

The conditions for $-\Delta_4$ EV (without a face) are that the histogram includes values of at least x4 EV in at least 20% of the regions, values of x5 EV or greater in at least one region, and values of x1 or less in not more than 10% of the regions, or values of x0 EV or less in 20% or more of the regions.

The conditions for $-\Delta_3$ EV (without a face) are that the histogram includes values of x4 EV or greater in at least 25% of the regions, no values of x5 EV or greater in any region, and values of x2 EV or smaller in not more than 10% of the regions.

The conditions for $-\Delta_2$ EV (without a face) are that the histogram includes values of x3 EV or greater in at least 50% of the regions.

All the conditions described above are shown in FIG. 9. The determination criteria vary depending on the presence or absence of a person's face in the scene, as shown by the columns in FIG. 9, in order to make the correction amount in the gray level correction relatively smaller when a person's face is included than when a person's face is not included, to minimize noise in images that include faces.

The exposure correction amount 4 EV, which is calculated in the exposure correction amount calculation section 16, is used to set the final exposure conditions when the still image is captured. The exposure correction amount 4 EV is also supplied to the gray level correction section 18, which provides adaptive tone scale processing in order to compensate for the particular exposure correction amount used to capture the still image. In other words, the exposure correction amount ΔEV is used both to adjust the image sensor exposure level for the final still image, and to perform digital adaptive tone correction on the captured still image data. Further, as shown in FIG. 9, the exposure correction amount ΔEV is set smaller when a person's face is included in a photographic scene than when a person's face is not included.

The invention has been described in detail with particular reference to certain preferred embodiments thereof but it will be understood that variations and modifications can be effected within the spirit and scope of the invention.

PARTS LIST

12 Region dividing and average section
14 Exposure assessment section
16 Exposure correction amount calculation section
18 Gray level correction section
20 Preview image
22 Preview exposure assessment section
26 Still image photographing exposure determination section
28 Photographing exposure prediction histogram generation section
30 Exposure correction amount determination section
32 Preview control section
101 Block
102 Block
103 Block
104 Block
105 Block
106 Block
107 Block
108 Block
109 Block
110 Block
111 Block
112 Block
113 Block
114 Block
115 Block
116 Block
117 Block
118 Block
119 Block
330 digital camera
302 flash
304 zoom lens
306 adjustable aperture and adjustable shutter
308 zoom and focus motor drives
310 exposure control block
312 timing generator
314 image sensor
316 ASP and A/D converter
318 DRAM buffer memory
320 processor
328 firmware memory
330 image memory
332 color LCD image display
334 user controls
340 home computer
350 wireless modem
352 RF channel
358 mobile phone network
362 dock interface
364 dock/recharger
370 Internet
372 photo service provider
400 view finder images
410 preview image analysis
411 face detection
412 motion analysis
413 auto focus
414 auto white balance
415 auto exposure
416 scene type classification
417 scene type
418 scene exposure value
419 relative exposure level
420 exposure program
425 exposure settings
430 rendering parameter program
435 rendering parameters
440 final sensor image data
450 still image processing pipeline
452 standard image pipeline
453 adaptive tone scale processing
454 file finishing and compression
460 finished image file data
500 block
510 block
520 block
524 block
526 block
528 block
529 block
530 block
540 block
550 block
560 block
570 block
580 block
710 input analysis image data
715 conversion to scene space
720 retrieve parameters for scene type
725 scene balance analysis
730 flare correction analysis
735 tone scale analysis
740 color correction processing
745 LCC conversion
750 luminance pedestal splitter
753 pedestal image
755 texture image
760 pedestal image tone scale application
765 luminance pedestal recombiner
770 chrominance images
775 RGB conversion
780 conversion to output color space

What is claimed is:

1. An image processing device comprising:
an image sensor configured to provide initial sensor image data and final sensor image data;
a lens configured to expose an image of a scene onto the image sensor;
an exposure control system that adjusts an exposure level of a final image on the image sensor in response to a scene type; and
a processor configured to:
process the initial sensor image data to select one of a plurality of pre-determined scene types, wherein processing the initial sensor image data comprises performing at least one of a face detection analysis, an auto focus analysis, or a motion analysis, and wherein the selected scene type is determined based on the at least one of the face detection analysis, the auto focus analysis, or the motion analysis, and wherein processing the initial sensor image data further includes determining whether an ISO exposure is equal to or greater than a threshold value if the selected scene type is not a text scene, provide the selected scene type to the exposure control system prior to capturing the final sensor image data to cause the exposure control system to adjust the exposure level of the final image on the image sensor, wherein the exposure control system sets the exposure level of the final image to be a default scene exposure level shifted by a pre-determined relative exposure level corresponding to the selected scene type and the ISO exposure, and process the final sensor image data to compensate for the exposure level of the final image on the image sensor by using a set of pre-determined exposure compensation processing parameters corresponding to the selected scene type and the ISO exposure.

2. The device of claim 1, wherein the processor is configured to further process the final sensor image data by using a pre-determined pipeline processing parameter corresponding to the selected scene type, which is selected from a group of parameter types including: neutral balance, color balance, flare correction, contrast adjustment, color saturation, sharpness adjustment, noise reduction, and combinations thereof.

3. The device of claim 1, wherein the processor is further configured to apply adaptive tone scale processing to the final image sensor data by using a set of pre-determined adaptive tone scale processing parameters corresponding to the selected scene type.

4. The device of claim 1, wherein the processor used the initial image data to detect faces, and wherein the plurality of scene types includes a first subset which includes faces and a second subset which does not include faces.

5. The device of claim 1, wherein the processor uses the initial image data to calculate average values for a plurality of n×m regions, uses the average values to form a histogram, and uses the histogram to select the scene type.

6. The device of claim 1, wherein the processor uses the initial image data to provide a preview image for display on a viewfinder display of the digital camera.

7. The device of claim 1, wherein the processing the initial sensor image data comprises performing each of the face detection analysis, the auto focus analysis, and the motion analysis, and wherein the selected scene type is determined based on a combination of the face detection analysis, the auto focus analysis, and the motion analysis.

8. The device of claim 7, wherein the processing the initial sensor image data further comprises performing an auto white balance analysis and an auto exposure analysis, and wherein the selected scene type is determined based on a combination of the face detection analysis, the auto focus analysis, the motion analysis, the auto white balance analysis, and the auto exposure analysis.

9. An image processing device, comprising:
an image sensor having an array of pixels that include different colored pixels and effective when actuated in a first mode for providing preview sensor image data and effective when actuated in a second mode for providing final sensor image data;
a lens configured to expose the image of a scene onto the image sensor;
an exposure control system that adjusts the exposure level of a final image on the image sensor in response to a scene type; and
a processor configured to:
process the preview image data to select one of a plurality of pre-determined scene types, wherein processing the preview image data comprises performing at least one of a face detection analysis, an auto focus analysis, or a motion analysis, and wherein the selected scene type is determined based on the at least one of the face detection analysis, the auto focus analysis, or the motion analysis, and wherein processing the initial sensor image data further includes determining whether an ISO exposure is equal to or greater than a threshold value if the selected scene type is not a text scene,
communicate the selected scene type to the exposure control system prior to image capture of the final sensor image data to cause the exposure control system to adjust the exposure level of the final image on the image sensor, wherein the exposure control system sets the exposure level of the final image to be a default scene exposure level shifted by a pre-determined relative exposure level corresponding to the selected scene type and the ISO exposure,
store the final sensor image data in response to the scene type by combining a plurality of pixels having the same color, and
process the stored final sensor image data to compensate for the exposure level of the final image by using a set of pre-determined exposure compensation processing parameters corresponding to the selected scene type and the ISO exposure.

10. The device of claim 9, wherein the processor is configured to further process the final sensor image data by using a pre-determined pipeline processing parameter corresponding to the selected scene type, which is selected from a group of parameter types including: neutral balance, color balance, flare correction, contrast adjustment, color saturation, sharpness adjustment, noise reduction, and combinations thereof.

11. The device of claim 9, wherein the processor is further configured to apply adaptive tone scale processing to the final image sensor data by using a set of pre-determined adaptive tone scale processing parameters corresponding to the selected scene type.

12. The device of claim 9, wherein the scene types include high contrast scene, low contrast scene, blue key scene, night scene, color saturated scene, and text scene.

13. A method comprising:
receiving initial sensor image data and final sensor image data from an image sensor;
adjusting an exposure level of a final image on the image sensor in response to a scene type;
processing the initial sensor image data to select one of a plurality of pre-determined scene types, wherein processing the initial sensor image data comprises performing at least one of a face detection analysis, an auto focus analysis, or a motion analysis, and wherein the selected scene type is determined based on the at least one of the face detection analysis, the auto focus analysis, or the motion analysis, and wherein processing the initial sensor image data further includes determining whether an ISO exposure is equal to or greater than a threshold value if the selected scene type is not a text scene;

prior to capturing the final sensor image data, adjusting the exposure level of the final image on the image sensor, wherein the exposure level of the final image is set to be a default scene exposure level shifted by a pre-determined relative exposure level corresponding to the selected scene type and the ISO exposure; and processing the final sensor image data to compensate for the exposure level of the final image on the image sensor by using a set of pre-determined exposure compensation processing parameters corresponding to the selected scene type and the ISO exposure.

14. The method of claim 13, further comprising processing the final sensor image data by using a pre-determined pipeline processing parameter corresponding to the selected scene type, which is selected from a group of parameter types including: neutral balance, color balance, flare correction, contrast adjustment, color saturation, sharpness adjustment, noise reduction, and combinations thereof.

15. The method of claim 13, further comprising applying adaptive tone scale processing to the final image sensor data by using a set of pre-determined adaptive tone scale processing parameters corresponding to the selected scene type.

16. The method of claim 13, wherein the scene types include high contrast scene, low contrast scene, (blue) sky scene, night scene, color saturated scene, and text scene.

17. The method of claim 13, further comprising detecting faces with the initial image date data, wherein the plurality of scene types includes a first subset which includes faces and a second subset which does not include faces.

18. The method of claim 13, further comprising calculating average values for a plurality of n×m regions using the initial image data.

* * * * *